(12) United States Patent
Takahashi

(10) Patent No.: US 10,140,555 B2
(45) Date of Patent: Nov. 27, 2018

(54) PROCESSING SYSTEM, PROCESSING METHOD, AND RECORDING MEDIUM

(71) Applicant: NEC Corporation, Tokyo (JP)

(72) Inventor: Yusuke Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 47 days.

(21) Appl. No.: 15/033,613

(22) PCT Filed: Oct. 2, 2014

(86) PCT No.: PCT/JP2014/076380
§ 371 (c)(1),
(2) Date: Apr. 29, 2016

(87) PCT Pub. No.: WO2015/064292
PCT Pub. Date: May 7, 2015

(65) Prior Publication Data
US 2016/0253581 A1    Sep. 1, 2016

(30) Foreign Application Priority Data

Oct. 30, 2013  (JP) .................................. 2013-225917

(51) Int. Cl.
*G06K 9/62* (2006.01)
*G06K 9/00* (2006.01)
*G06K 9/46* (2006.01)

(52) U.S. Cl.
CPC ....... *G06K 9/6277* (2013.01); *G06K 9/00362* (2013.01); *G06K 9/4652* (2013.01);
(Continued)

(58) Field of Classification Search
CPC ............. G06K 9/00362; G06K 9/4652; G06K 9/6212; G06K 9/6215; G06K 9/6269; G06K 9/627; G06K 9/6277; G06K 9/628
See application file for complete search history.

(56) References Cited

U.S. PATENT DOCUMENTS

2012/0301014 A1* 11/2012 Xiao ................. G06F 17/30247
382/159
2014/0163424 A1   6/2014 Kawaguchi et al.

FOREIGN PATENT DOCUMENTS

JP     2005-165965        6/2005
JP     2005-165965 A *  6/2005
(Continued)

OTHER PUBLICATIONS

Machine Translation of Kawaguchi et al (JP2012-181736 A1), accessed Aug. 28, 2017.*

(Continued)

*Primary Examiner* — Edward Park
(74) *Attorney, Agent, or Firm* — Finnegan, Henderson, Farabow, Garrett & Dunner, L.L.P.

(57) ABSTRACT

A processing system includes an input unit and a generation unit. The input unit receives an input of a plurality of sample images obtained by capturing an object associated with a category in different conditions with respect to a plurality of the categories. The generation unit generates likelihood distribution information in which each value representing a possible feature of each pixel or each pixel block, and each value representing a likelihood belonging to each of the categories are associated with each other, based on a feature of each pixel or each pixel block included in an area relating to each of the objects within the plurality of sample images associated with a category.

9 Claims, 12 Drawing Sheets

(52) U.S. Cl.
CPC .............. *G06K 9/627* (2013.01); *G06K 9/628* (2013.01); *G06K 9/6212* (2013.01); *G06K 9/6215* (2013.01); *G06K 9/6269* (2013.01)

(56) References Cited

FOREIGN PATENT DOCUMENTS

| | | |
|---|---|---|
| JP | 2005-250692 | 9/2005 |
| JP | 2008-85995 | 4/2008 |
| JP | 2009-231921 | 10/2009 |
| JP | 2010-68120 | 3/2010 |
| JP | 2011-60024 | 3/2011 |
| JP | 2011-237907 | 11/2011 |
| JP | 2012-181736 | 9/2012 |
| JP | 2012-181736 A * | 9/2012 |
| JP | 2013-117860 | 6/2013 |
| WO | WO 2012/131816 A1 | 10/2012 |

OTHER PUBLICATIONS

Machine Translation of Hiroyuki et al (JP 2005-165965), accessed Aug. 28, 2017.*
International Search Report and Written Opinion dated Dec. 16, 2014, in corresponding PCT International Application.
Notification of Reason for Refusal with English Language translation issued by the Japanese Patent Office dated Jun. 5, 2018, in Japanese application No. 2015-544890.

* cited by examiner

Fig. 3

| PIXEL VALUE (RGB) | | | LIKELIHOOD IN CATEGORY | | | | | | |
|---|---|---|---|---|---|---|---|---|---|
| R | G | B | CATEGORY 1 | CATEGORY 2 | CATEGORY 3 | CATEGORY 4 | CATEGORY 5 | CATEGORY 6 | ... |
| 0 | 0 | 0 | 1.0 | 0.0 | 0.0 | 0.0 | 0.0 | 0.0 | ... |
| 255 | 0 | 0 | 0.0 | 0.7 | 0.0 | 0.0 | 0.3 | 0.0 | ... |
| 239 | 170 | 123 | 0.0 | 0.3 | 0.1 | 0.1 | 0.0 | 0.5 | ... |
| ... | ... | ... | ... | ... | ... | ... | ... | ... | ... |

108

PROCESSING SYSTEM, PROCESSING METHOD, AND RECORDING MEDIUM

CROSS-REFERENCE TO RELATED PATENT APPLICATIONS

This application is a National Stage Entry of International Application No. PCT/JP2014/076380, filed Oct. 2, 2014, which claims priority from Japanese Patent Application No. 2013-225917, filed Oct. 30, 2013. The entire contents of the above-referenced applications are expressly incorporated herein by reference.

TECHNICAL FIELD

Some of the aspects of the present invention relate to a processing system, a processing method, and a recording medium relating to an image feature.

BACKGROUND ART

In image processing, it is often the case that various features such as color information are used. For instance, PTL 1 discloses using luminance distribution information, luminance contour information, and color distribution information, as feature information indicative of a feature of a person included in an image.

In addition to the above. PTL 2 to PTL 5 disclose the related art.

CITATION LIST

Patent Literature

[PTL 1] Japanese Laid-open Patent Publication No. 2011-060024
[PTL 2] Japanese Laid-open Patent Publication No. 2010-068120
[PTL 3] Japanese Laid-open Patent Publication No. 2009-231921
[PTL 4] Japanese Laid-open Patent Publication No. 2008-085995
[PTL 5] Japanese Laid-open Patent Publication No. 2005-250692

SUMMARY OF INVENTION

Technical Problem

The feature to be extracted from each image varies depending on a capturing condition of each image or the like, even when the images relates to a same object. In view of the above, the approach of PTL 1 takes into account a degree of reliability indicative of the level of reliability of feature information.

However, it is not always the case that a feature of a high degree of reliability is obtained from an image. In such a case, it is difficult to appropriately perform processing of using a feature, for instance, determine whether objects (including a person) are identical to each other.

In view of the above, an object of some of the aspects of the invention is to provide a processing system, a processing method, and a program relating to an image feature, which enable to appropriately process the image feature.

Solution to Problem

A processing system relating to an image feature according to the invention, the processing system including: an input unit which receives an input of a plurality of sample images obtained by capturing an object associated with a category in different conditions with respect to a plurality of the categories: and a generation unit which generates likelihood distribution information in which each value representing a possible feature of each pixel or each pixel block, and each value representing a likelihood belonging to each of the categories are associated with each other, based on a feature of each pixel or each pixel block included in an area relating to each of the objects within the plurality of sample images associated with a category.

A processing system relating to an image feature according to the invention, the processing system including: an input unit which receives an input of an image; a storage unit which stores likelihood distribution information in which each value representing a possible feature of each pixel or each pixel block of the image, and each value representing a likelihood belonging to each of a plurality of categories are associated with each other; and a generation unit which generates category likelihood information indicative of a likelihood distribution relating to the plurality of categories of an object area by referring to the likelihood distribution information with respect to a value representing a feature of each pixel or each pixel block of the object area within the image.

A processing method relating to an image feature according to the invention, the processing method including: receiving an input of a plurality of sample images obtained by capturing an object associated with a category in different conditions with respect to a plurality of the categories; and generating likelihood distribution information in which each value representing a possible feature of each pixel or each pixel block, and each value representing a likelihood belonging to each of the categories are associated with each other, based on a feature of each pixel or each pixel block included in an area relating to each of the objects within the plurality of sample images associated with a category.

A processing method relating to an image feature according to the invention, the processing method including: receiving an input of an image; storing likelihood distribution information in which each value representing a possible feature of each pixel or each pixel block of the image, and each value representing a likelihood belonging to each of a plurality of categories are associated with each other; and generating category likelihood information indicative of a likelihood distribution relating to the plurality of categories of an object area by referring to the likelihood distribution information with respect to a value representing a feature of each pixel or each pixel block of the object area within the image.

A non-transitory computer readable storage medium recording thereon a program relating to an image feature according to the invention, the program causing a computer to execute: a process of receiving an input of a plurality of sample images obtained by capturing an object associated with a category in different conditions with respect to a plurality of the categories; and a process of generating likelihood distribution information in which each value representing a possible feature of each pixel or each pixel block, and each value representing a likelihood belonging to each of the categories are associated with each other, based on a feature of each pixel or each pixel block included in an area relating to each of the objects within the plurality of sample images associated with a category.

A non-transitory computer readable storage medium recording thereon a program relating to an image feature, the program causing a computer to execute: a process of receiving an input of an image; a process of storing likelihood distribution information in which each value representing a possible feature of each pixel or each pixel block of the image, and each value representing a likelihood belonging to each of a plurality of categories are associated with each other; and a process of generating category likelihood information indicative of a likelihood distribution relating to the plurality of categories of an object area by referring to the likelihood distribution information with respect to a value representing a feature of each pixel or each pixel block of the object area within the image.

In the invention, a "unit", a "means", a "device", or a "system" may simply indicate a physical circuit, but may include a case in which a function of the "unit", the "means", the "device", or the "system" is implemented by a software component. Further, the function of the "unit", the "means", the "device", or the "system" may be implemented by two or more physical means or devices, or the functions of two or more "units", "means", "devices", or "systems" may be implemented by a physical means or a device.

Advantageous Effects of Invention

According to the invention, it is possible to provide a processing system, a processing method, and a program relating to an image feature, which enable to appropriately process the image feature.

BRIEF DESCRIPTION OF DRAWINGS

FIG. 3 is a diagram illustrating an example of a likelihood table;

DESCRIPTION OF EMBODIMENTS

Figure 1:
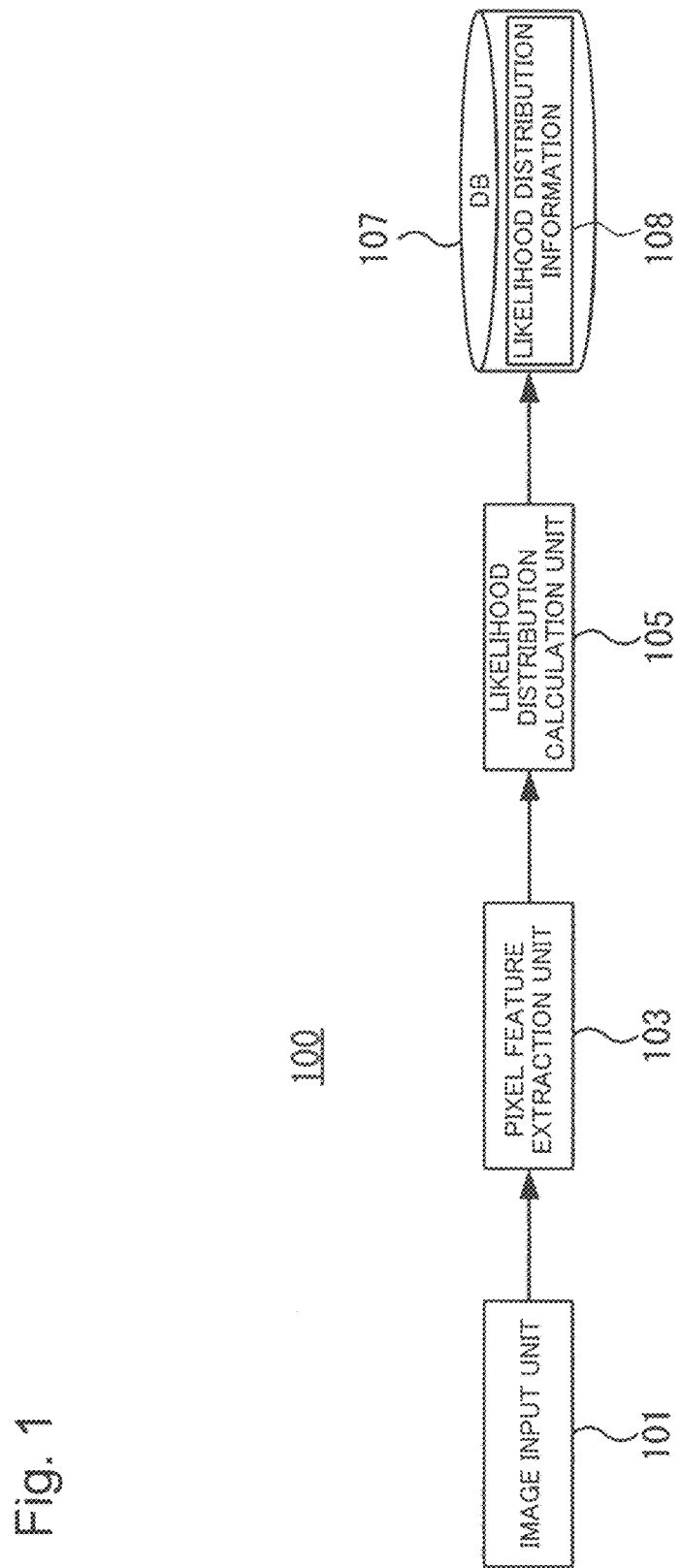
FIG. 1 is a functional block diagram illustrating a schematic configuration of an image processing system in a first exemplary embodiment.

In the following, exemplary embodiments of the invention are described. In the following description and illustration of the drawings to be referred to, the same or similar constituent elements are indicated by the same or similar reference signs.

1 First Exemplary Embodiment

FIG. 1 to FIG. 11 are diagrams for describing the first exemplary embodiment. In the following, the first exemplary embodiment is described referring to these drawings. The processing in the exemplary embodiment is roughly classified to the processing of generating likelihood category information, and the processing of using the likelihood category information. Therefore, in the section "1.1", the processing of generating likelihood category information is described, and in the section "1.2", the processing of using likelihood category information is described. In the section "1.3", an example of a hardware configuration capable of executing the processing of generating likelihood category information, and the processing of using likelihood category information are described. Lastly, in the section "1.4", the advantageous effects of the exemplary embodiment are described.

1.1 Processing of Generating Likelihood Category Information (1.1.1 Summary)

Specifying an object (including a person), for each of the persons included in images (including image frames composing a video) captured by one or more cameras is required for the purpose of monitoring or searching. In this case, an image feature such as a hue, a luminance, or an edge may be extracted from an object area of an object included in an image, and a degree of similarity between the image feature may be calculated for sameness determination. However, the image feature of a captured image may greatly vary depending on various factors such as the illumination, the orientation of a target object, or the size of a target object in the image.

In order to suppress an influence by the environmental change as described above, there is proposed a method for determining the distance between features for sameness determination. For instance, there is proposed an approach, in which an index representing a distance between features is learned in a high-dimensional nonlinear space, and a degree of similarity is calculated by using the distance index in the high-dimensional nonlinear space. However, the aforementioned computation approach requires a large amount of processing. Therefore, the approach is not practical for a real-time operation.

In view of the above, an image processing system 100 in the exemplary embodiment is configured to generate likelihood distribution information, which is data obtained by learning a change in the image feature accompanied by the orientation or the posture of an object, or an illumination condition by using sample images captured in different environments in advance. In collating an object area of an image, an image feature such as a color value is not directly used, but a category-based feature obtained by referring to likelihood distribution information based on an image feature is used for collation. Thus, collation with a high degree of accuracy is performed with a less amount of computation.

(1.1.2 System Configuration)

In the following, a system configuration of the image processing system 100 configured to perform processing of generating likelihood category information in the exemplary embodiment is described referring to FIG. 1. FIG. 1 is a block diagram illustrating the system configuration of the image processing system 100.

The image processing system 100 includes an image input unit 101, a pixel feature extraction unit 103, a likelihood distribution calculation unit 105, and a database 107.

The image input unit 101 receives an input of multitudes of sample images (including image frames composing moving images) including a target object from one or more capturing devices such as a monitor camera, a CCD (Charge Coupled Device) digital camera, or a video camera. The target object is captured in various capturing conditions in which the illumination condition, the distance from a capturing device, or the orientation of the object are different from each other.

When the input is received, an object area is specified for each of the sample images to be input from the image input unit 101, and a category (to be described later in details) is associated with the object area. The object area may be the entirety of an image. Specifically, when an object is included in the entirety of a sample image or in a major part of a sample image, the entirety of the image may be regarded as an object area.

Examples of an object included in an object area may be various moving objects such as persons, vehicles, bicycles, bikes, and cargos. In the following example, description is mainly made based on the premise that a target object is a person.

An object area may be specified by image processing by a computer or the like, or may be specified by a person. When image processing by a computer is performed, for instance, an object area may be specified by a background difference such that a background image (an image mainly composed of a still object) that is prepared in advance or generated, and an image including various objects such as a person are compared. Further, when an object is captured while moving a capturing device such as a video camera, the target object as a foreground, and a background may be separated from each other by using an optical flow (movement of each pixel area), and an object area may be specified by using a difference in flow (moving amount) in the vicinity of a center of an angle of view. Alternatively, when a target object is known, it is possible to estimate a target area (object area) from prior knowledge. For instance, when the upper garment of a person is an area to be detected, the whole body area of the person is specified by detecting the head, the upper half of the body, and the like. Then, the head area and the lower half of the body can be eliminated by using one third to one half of the whole body area of the person from the uppermost position.

A category is, for instance, a visual classification for expressing an object. For instance, the category may include clothes of any color selected by the user such as blue clothes, yellow clothes, purple clothes, or black clothes; and clothes of any pattern selected by the user such as clothes with blue and red stripes, or clothes with white and red dots. With use of each category, for instance, it is possible to select clothes of the same material having different colors and different patterns. This is because selecting clothes of the same material as described above makes it possible to acquire variation in color due to variation in capturing environment such as illumination variation or posture variation in a state that variation in color or pattern due to a difference in material is eliminated.

There may be an approach, in which general color-based classification using e.g. "blue" is selected, in place of selecting clothes of a certain color, as a category. However, when such a general color-based classification is selected, the range of color is unclear, and blue may include sky blue and navy blue. As a result, the associated range in the color space may be widened. In other words, when clothes of sky blue and clothes of navy blue are expressed in terms of feature with use of the general color category, both sky blue and navy blue may be expressed as blue. Therefore, when a color selected in a general color space is used, data may be acquired in a state that a difference between "sky blue" and "navy blue", and a difference between "bright blue and dark blue due to illumination variation" coexist.

On the other hand, when "blue clothes" is selected as clothes of a certain color, it is possible to exclusively acquire a distribution of a specific blue color, as a color distribution in a capturing environment. When clothes of different colors are employed, clothes of sky blue and clothes of navy blue are respectively expressed by combination of blue clothes and white clothes, and combination of blue clothes and black clothes. Blue clothes, white clothes, and black clothes are captured in different capturing environments. Therefore, it is possible to express clothes of sky blue and clothes of navy blue including illumination variation by combination of blue clothes and white clothes and by combination of blue clothes and black clothes in a stable manner.

In the following, description is made based on a case, in which the category is a color of clothes.

A sample image to be input from the image input unit 101 may be, for instance, an image such that each person wearing clothes of a category to be processed such as red or blue is captured in advance in a condition in which the illumination condition, the distance from a capturing device, or the orientation of the person are different from each other. In this case, an image of a person (object) in each category may be captured in different conditions.

Figure 2:
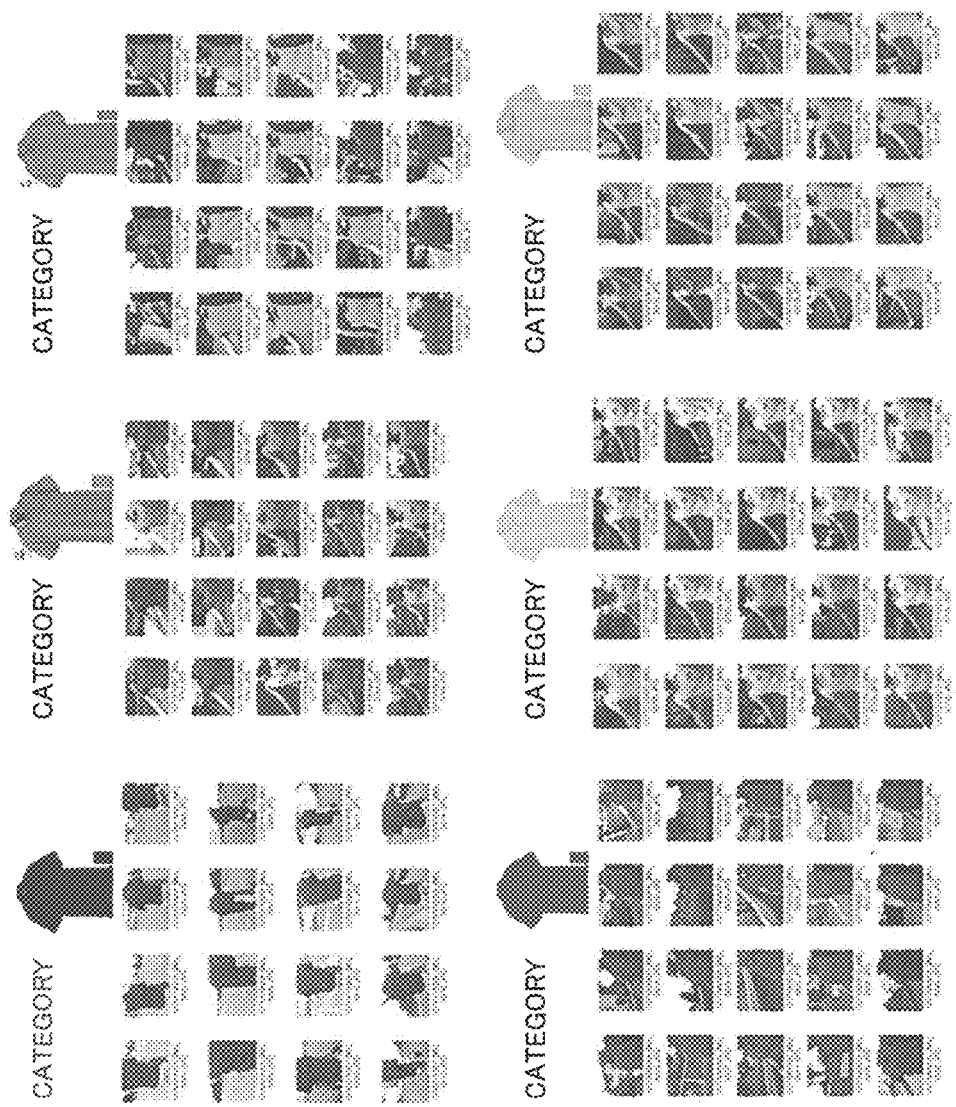
FIG. 2 is a diagram illustrating an example of sample images for each category.

FIG. 2 is a diagram illustrating an example of sample images to be input from the image input unit 101. In the example of FIG. 2, each twenty pieces of sample images obtained by capturing a person of each category (corresponding to each color of a shirt in the example of FIG. 2) in different conditions such as at different times, at different places, and in different illumination environments are input to the image input unit 101. The number of input images is not limited to the above. The number of input images may be not smaller than the above or may be not larger than the above.

The pixel feature extraction unit 103 extracts a visual feature (pixel value) from each pixel in an object area within the sample images input by the image input unit 101.

The likelihood distribution calculation unit 105 obtains, as likelihood distribution information 108 representing a likelihood as a category of a visual feature, how frequently the visual feature to be acquired from an object area appears for each category, with use of each pixel value in the object area of a sample image, which is extracted by the pixel feature extraction unit 103, and with use of a category associated with each of the object areas. More specifically, the likelihood distribution calculation unit 105 analyzes each pixel in an object area associated with a category, and generates the likelihood distribution information 108 representing a degree of accuracy (likelihood) with which each pixel value belongs to each category.

In the following, the exemplary embodiment is described by way of an example. As illustrated in FIG. 2, the color of clothes is used as an example of a visual feature. The pixel feature extraction unit 103 extracts a pixel value (visual feature) with respect to each pixel in an object area of a sample image including each object (such as a red shirt or a yellow shirt) as illustrated in FIG. 2. The pixel value may be expressed in various ways, including an edge in a vertical direction/a horizontal direction/an oblique direction, in addition to a feature of a color expressed by e.g. RGB, HSV, Lab, or YCbCr. In this example, the pixel value is an RGB value. When clothes having a pattern is selected as a category, a feature capable of expressing a pattern such as an edge may be used. The likelihood distribution calculation unit 105 records a frequency of appearance for each pixel value included in an object area with respect to the object area of each category.

Performing the aforementioned processing for all the categories to be processed (shirts of six colors in the example of FIG. 2) makes it possible to obtain data representing a frequency of appearance for six categories with respect to each pixel value.

The likelihood distribution calculation unit 105 calculates a likelihood indicative of to which category a certain pixel value (in this example, an RGB value) is likely to belong by normalizing data on the frequency of appearance (distribution). This makes it possible to generate a likelihood table (likelihood distribution information 108) as illustrated in FIG. 3.

In the example of the likelihood table (likelihood distribution information 108) illustrated in FIG. 3, the pixel values (RGB value) in the three left columns denote pixel values in an image, and the values in the rest of the columns denote likelihoods belonging to the respective categories. In the example of FIG. 3, when (R, G, B)=(0, 0, 0), the likelihood belonging to category 1 is 1, and the likelihood belonging to the rest of the categories are all 0. Likewise, when (R, G, B)=(255, 0, 0), the likelihood belonging to category 2 is 0.7, the likelihood belonging to category 5 is 0.5, and the likelihoods belonging to the rest of the categories are all 0. When (R, G, B)=(239, 170, 123), the likelihoods belonging to categories 2, 3, 4, and 6 are respectively 0.3, 0.1, 0.1, and 0.5.

In the following, the details of the method for calculating a likelihood are described. When it is assumed that the number of categories is m, the group C of categories can be expressed as follows.

$$C=\{c_l | l=1,2,\ldots m\}$$

Further, the pixel value is a value obtained by digitizing the RGB color space into 256×256×256. It is also possible to use a pixel value whose degree of granularity is larger, or a pixel value whose degree of granularity is smaller. It can be said that creating a likelihood table (likelihood distribution information 108) is calculating a likelihood $W(c|g_i)$ of a category $c \in C$ of a color value $g_i$ (i=1, 2, ...., 256×256×256) in a three-dimensional color space.

A sample image group in which a category is associated with a target object to be displayed is used for creating a likelihood table. It is assumed that the number of sample images (object areas) associated with the category c is $N_c$. As described above, an object area (mask area) from which pixels are extracted is set in each of the sample images. It is assumed that the number of pixels to be extracted from the i-th sample image (object area) is $n_{c,i}$. When the digitized pixel value g is given, the value W(c|g) to be returned from the likelihood table is as follows.

$$W(c|g) = \frac{D(g|c)}{\sum_{k=1}^{m} D(g|k)} \quad (1)$$

In Eq. (1), D(g|c) is the number in proportion to the distribution of the pixel value g belonging to the category c, and can be given by Eq. (2).

$$D(g|c) = \sum_{i=1}^{N_c} \sum_{k=1}^{N_{c,i}} d(g, g_{i,k}|c) \quad (2)$$

where $g_{i,k}$ is the pixel value of the k-th pixel in the i-th image (object area), and d is a weight expressed by Eq. (3).

$$d(g, g_{i,k}|c) = \begin{cases} \frac{1}{n_{c,j} \cdot N_c} & \ldots g = g_{i,k} \\ \frac{1}{2n_{c,j} \cdot N_c} & \ldots \text{dist}(p, g_{i,k}) < \text{threshold } th \\ 0 & \ldots \text{otherwise} \end{cases} \quad (3)$$

where dist(a, b) is a function for use in calculating a distance between a and b in a color space.

The symbol d corresponds to a weight of one pixel within a learning image at the time of calculating a pixel value distribution. For instance, when it is assumed that the number of sample images is thirty, and the area (the number of pixels) in each object area is two hundred, the weight per pixel is 1/(30×200). Further, in order to improve robustness, in Eq. (3), a weight of one-half of the weight is applied to a pixel having a pixel value, which is adjacent to the pixel by a distance equal to or smaller than the threshold value th in the color space.

The likelihood table (likelihood distribution information 108) generated by the likelihood distribution calculation unit 105 is output and stored in the database 107. The storage method may be such that the likelihood table is stored in a storage medium such as a built-in HDD, or is stored in a storage medium within another information processing device to be connected via a network.

(1.1.3 Flow of Processing)

Figure 4:
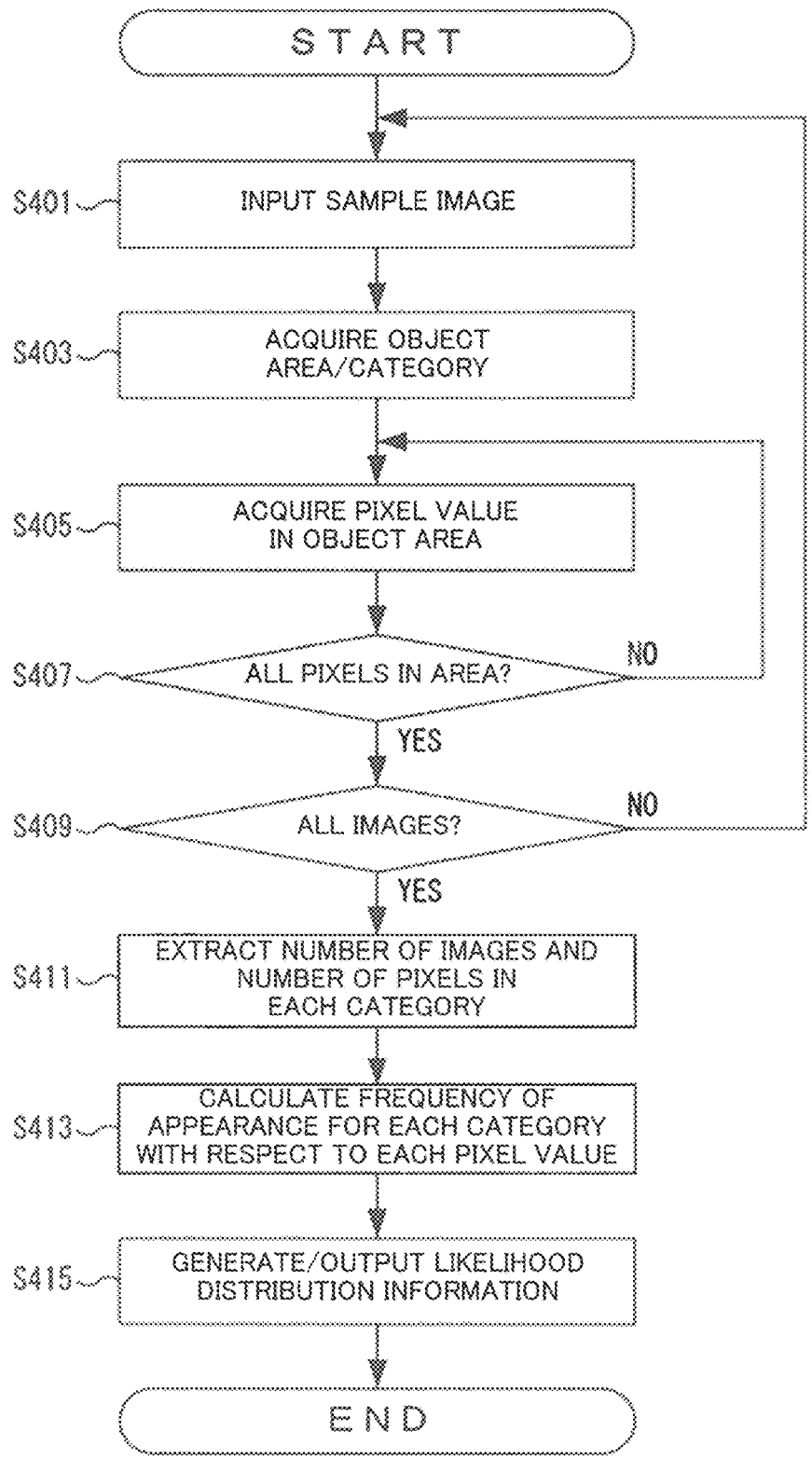
FIG. 4 is a flowchart illustrating a flow of processing by the image processing system illustrated in FIG. 1.

In the following, a flow of processing by the image processing system 100 is described referring to FIG. 4. FIG. 4 is a flowchart illustrating a flow of processing of generating the likelihood distribution information 108 (likelihood table) in the image processing system 100 in the exemplary embodiment.

Each of the processing steps to be described later may be executed by changing the order of processing steps as intended or may be concurrently executed, as far as contradiction is not involved in the processing contents. Further, any other step may be added between the processing steps. Further, a step described as one step for sake of convenience may be divided and executed as a plurality of steps, and a step described as a plurality of steps for sake of convenience may be executed as one step. The same idea is also applied to the flowcharts of FIG. 9 and FIG. 10.

As a first step, the image input unit 101 receives an input of a sample image (Step S401). In receiving an input, the image input unit 101 also receives information relating to an object area in the sample image including an object, and relating to a category of the object (Step S403).

The pixel feature extraction unit 103 selects one pixel from the object area within the sample image, and extracts a pixel value (e.g. RGB value) of the pixel (Step S405). The pixel feature extraction unit 103 performs the aforementioned pixel value extraction for all the pixels in the object area (Step S407). Further, when the processing for the pixels in all the object areas within the sample image is finished (Step S407), the pixel feature extraction unit 103 performs the same processing as described above for a next sample image (No in Step S409).

The pixels to be extracted by the pixel feature extraction unit 103, and the pixels to be processed by the likelihood distribution calculation unit 105 to be described later may not be individual pixels, but may be a block of pixels (pixel block). In this case, it is possible to use an average value of pixel values within a pixel block, or a pixel value which appears most frequently within a pixel block, as a representative pixel value of the pixel block. According to this configuration, the number of pixels to be processed thereafter is reduced. This is advantageous in increasing the processing speed.

When the processing for the pixels in all the object areas within all the sample images is finished (Yes in Step S409), the likelihood distribution calculation unit 105 calculates the number of images (number of object areas) and the number of pixels of each category with respect to each of the categories (Step S411). Subsequently, the likelihood distribution calculation unit 105 calculates a frequency of appearance (likelihood) for each category with respect to each pixel value based on the number of images, the number of pixels, and the pixel values (Step S413). The likelihood distribution calculation unit 105 summarizes the calculated information as the likelihood distribution information 108 (likelihood table), and outputs the likelihood distribution information 108 to the database 107 (Step S415).

1.2 Processing of Using Likelihood Category Information

Next, the processing of using likelihood category information is described referring to FIG. 5 to FIG. 10. In the following, an image processing system 500 determines whether objects are identical to each other by using likelihood category information.

(1.2.1 System Configuration)

Figure 5:
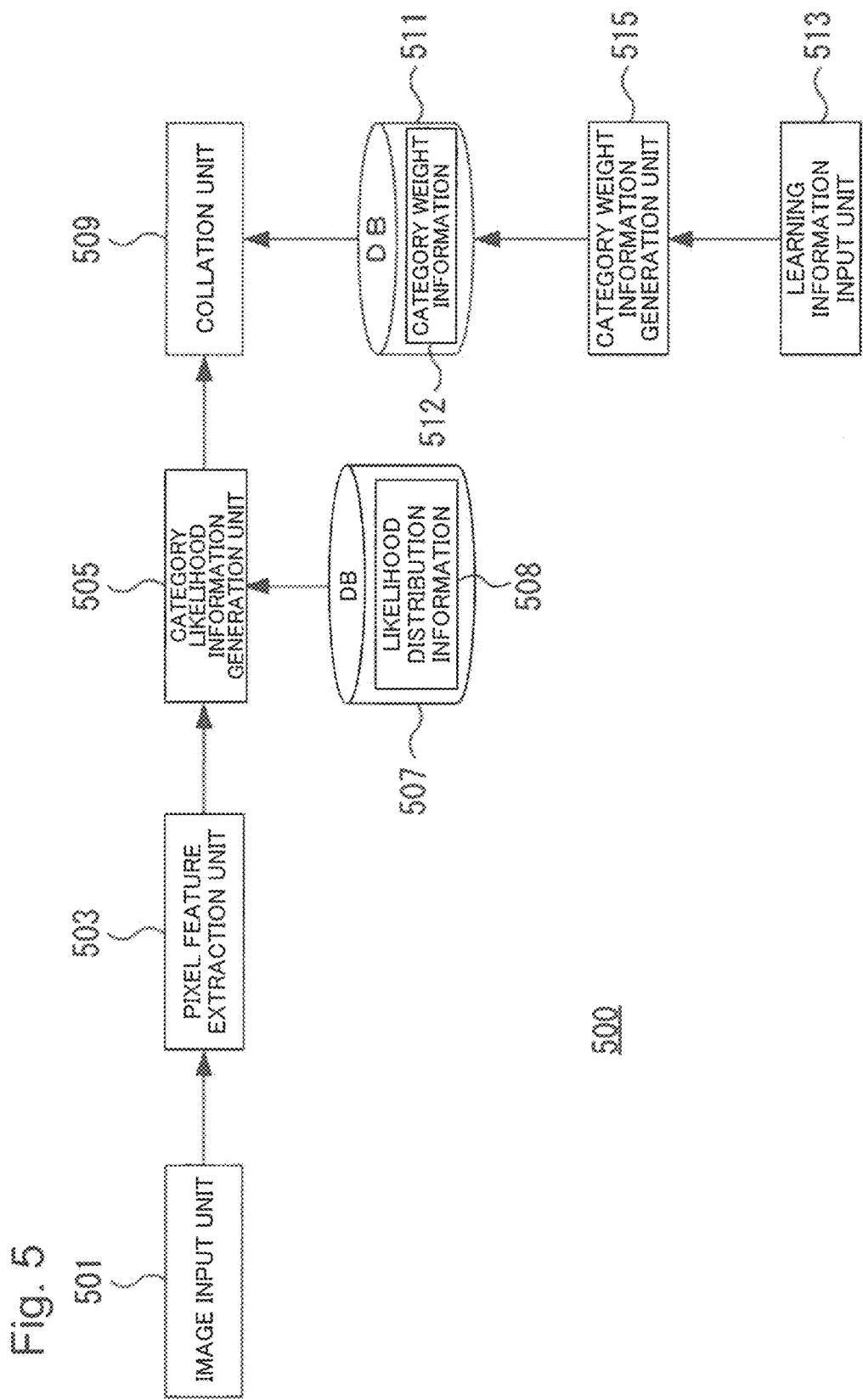
FIG. 5 is a functional block diagram illustrating a schematic configuration of an image processing system in the first exemplary embodiment.

A system configuration of the image processing system 500 for performing processing of using likelihood category information in the exemplary embodiment is described referring to FIG. 5. FIG. 5 is a block diagram illustrating the system configuration of the image processing system 500. The image processing system 500 may be implemented in the information processing device (computer) for the image processing system 100, or the image processing system 100 and the image processing system 500 may be individually implemented in information processing devices.

The image processing system 500 includes an image input unit 501, a pixel feature extraction unit 503, a category likelihood information generation unit 505, a database 507, a collation unit 509, a database 511, a learning information input unit 513, and a category weight information generation unit 515. These constituent elements may not be necessarily implemented by one information processing device, but may be implemented by two or more information processing devices. For instance, the learning information input unit 513 and the category weight information generation unit 515 may be implemented in an information processing device other than the information processing device for the image input unit 501, the pixel feature extraction unit 503, the category likelihood information generation unit 505, and the collation unit 509.

The image input unit 501 receives an input of images of an object to be detected (including image frames composing moving images), which are captured by one or more capturing devices such as a monitor camera, a CCD digital camera or a video camera.

The pixel feature extraction unit 503 obtains a visual feature relating to an object to be processed within an image. An example of the visual feature is color features by RGB, HSV, Lab, or YCbCr, or edges in a horizontal direction/a vertical direction/an oblique direction. In the following example, an RGB value is used as the visual feature.

The pixel feature extraction unit 503 detects a position (area) of a target object within an input image. There are various position detection approaches. For instance, the position of a target object is specified by a background difference such that a background image (image mainly composed of a still object) that is prepared in advance or generated, and an image including various objects such as a person are compared. Further, when an object is captured while moving a capturing device such as a video camera, a target object as a foreground, and a background may be separated from each other by using an optical flow (movement of each pixel area), and an object area is specified by using a difference in flow (moving amount) in the vicinity of a center of an angle of view. Alternatively, when a target object is known, it is possible to specify a target area (object area) from prior knowledge. For instance, when the upper garment of a person is an area to be detected, the whole body area of the person is specified by detecting the head, the upper half of the body, and the like. Then, the head area and the lower half of the body can be eliminated by using one third to one half of the whole body area of the person from the uppermost position.

Figure 6:
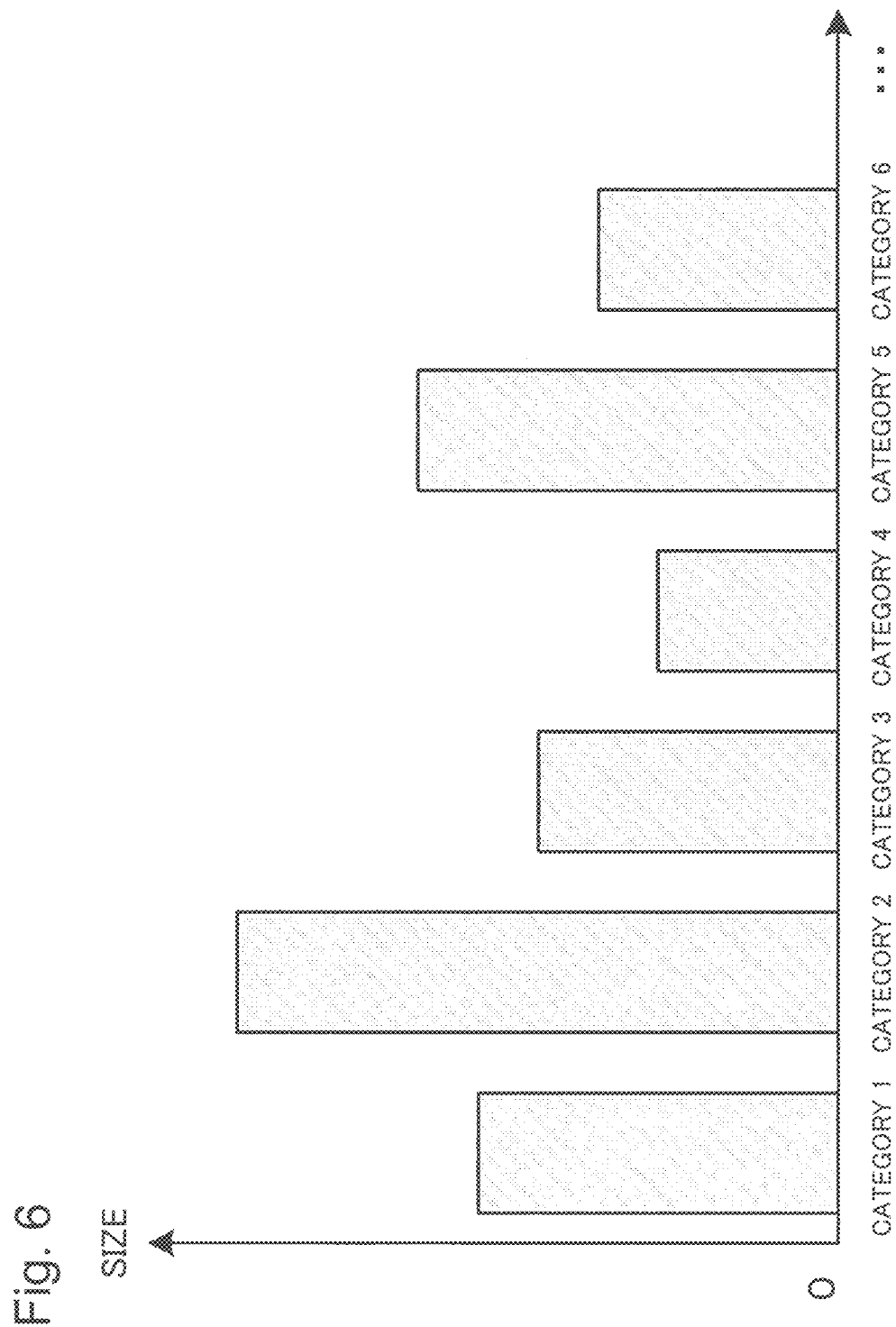
FIG. 6 is a diagram illustrating an example of a category histogram.

The category likelihood information generation unit 505 generates category likelihood information as exemplified in FIG. 6 by referring to the likelihood distribution information 508 stored in the DB 507 as necessary, while using a pixel value extracted from each pixel within the object area by the pixel feature extraction unit 503 as a key. The likelihood distribution information 508 to be stored in the DB 507 can be generated by the image processing system 100, and an example of the likelihood distribution information 508 is illustrated in FIG. 3.

Category likelihood information to be generated by the category likelihood information generation unit 505 is information obtained by acquiring a likelihood belonging to each category, which is obtained by referring to the likelihood table (likelihood distribution information 508) with respect to a pixel value of each pixel within an object area of an input image, summing the values for each category, and normalizing the result. Specifically, the category likelihood information is not information such that a feature of an object area to be processed is expressed in terms of pixel value as exemplified by color information such as an RGB value or edge information, but is a feature to be expressed by a histogram indicative of a distribution ratio of each category. In other words, category likelihood information is information such that a feature of an object area to be processed is expressed in terms of a few categories, which are learned as the likelihood distribution information 508 in advance.

In the following, an example of the processing by the category likelihood information generation unit 505 is described referring to FIG. 6.

Figure 7:
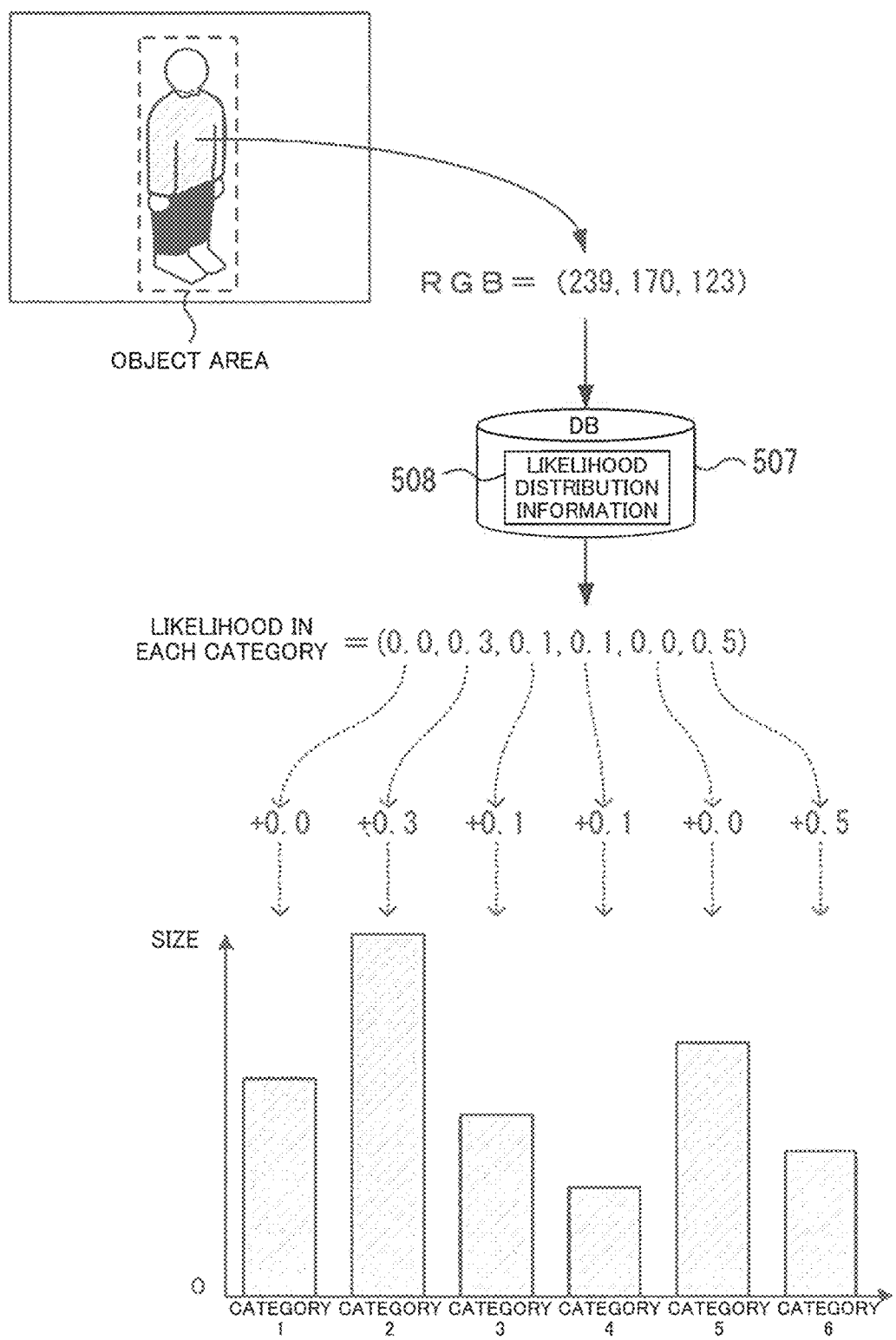
FIG. 7 is a diagram for describing a method for generating a category histogram.

As described above, the pixel feature extraction unit 503 specifies an object area from an input image, and extracts a pixel value of each pixel within the object area. In the example of FIG. 7, an RGB value (239, 170, 123) is extracted as a pixel value.

The category likelihood information generation unit 505 refers to the likelihood distribution information 508 while using the pixel value as a key. Referring to the example of FIG. 3, when the RGB value is (239, 170, 123), the likelihoods of the respective categories are (0.0, 0.3, 0.1, 0.1, 0.0, 0.5). Then, these values (likelihoods of the categories) are added to the value of bin to be generated for each category. The category likelihood information generation unit 505 generates a category histogram by repeating the same processing as described above to each pixel within an object area to be processed. Lastly, normalization is performed by dividing the summation result by the pixel number, so that the sum for each category becomes one. Thus, category likelihood information (category histogram) is generated.

Referring back to FIG. 5, the collation unit 509 determines whether the degree of similarity of category likelihood information (category histogram) exceeds a threshold value in order to determine sameness of an object area of each image. When the degree of similarity exceeds the threshold value, it is possible to determine that the objects included in two object areas are identical to each other.

There are various methods for calculating a degree of similarity. For instance, when it is assumed that category histograms of two object areas A and B for which a degree of similarity is calculated are respectively FetA and FetB, it is possible to calculate a degree of similarity s(A, B) as follows.

$$s(A, B) = \sum_{i=1}^{m} \alpha_i \min(FetA_i, FetB_i) \quad (4)$$

In Eq. (4), m denotes the number of categories, and min(a, b) denotes a function of returning a smaller value between a and b. The symbol $\alpha_i$ denotes a weight to be set in advance for each category, and corresponds to category weight information 512 to be stored in the DB 511, which will be described later in details. When Eq. (4) is used, it is not necessary to perform computation of a quadratic polynomial or a higher-order polynomial. Therefore, it is possible to increase the computation speed.

The method for calculating a degree of similarity is not limited to Eq. (4) as described above. For instance, it is possible to calculate a degree of similarity by the Euclid's distance method.

A DB 511 stores the category weight information 512 as described above. The category weight information 512 is used for calculating a degree of similarity for each category by the collation unit 509, and is generated by the category weight information generation unit 515. The storage method by the DB 511 may be such that the category weight information 512 is stored in an built-in storage medium such as an HDD, or is stored in a storage medium within another information processing device to be connected via a network.

Figure 8:
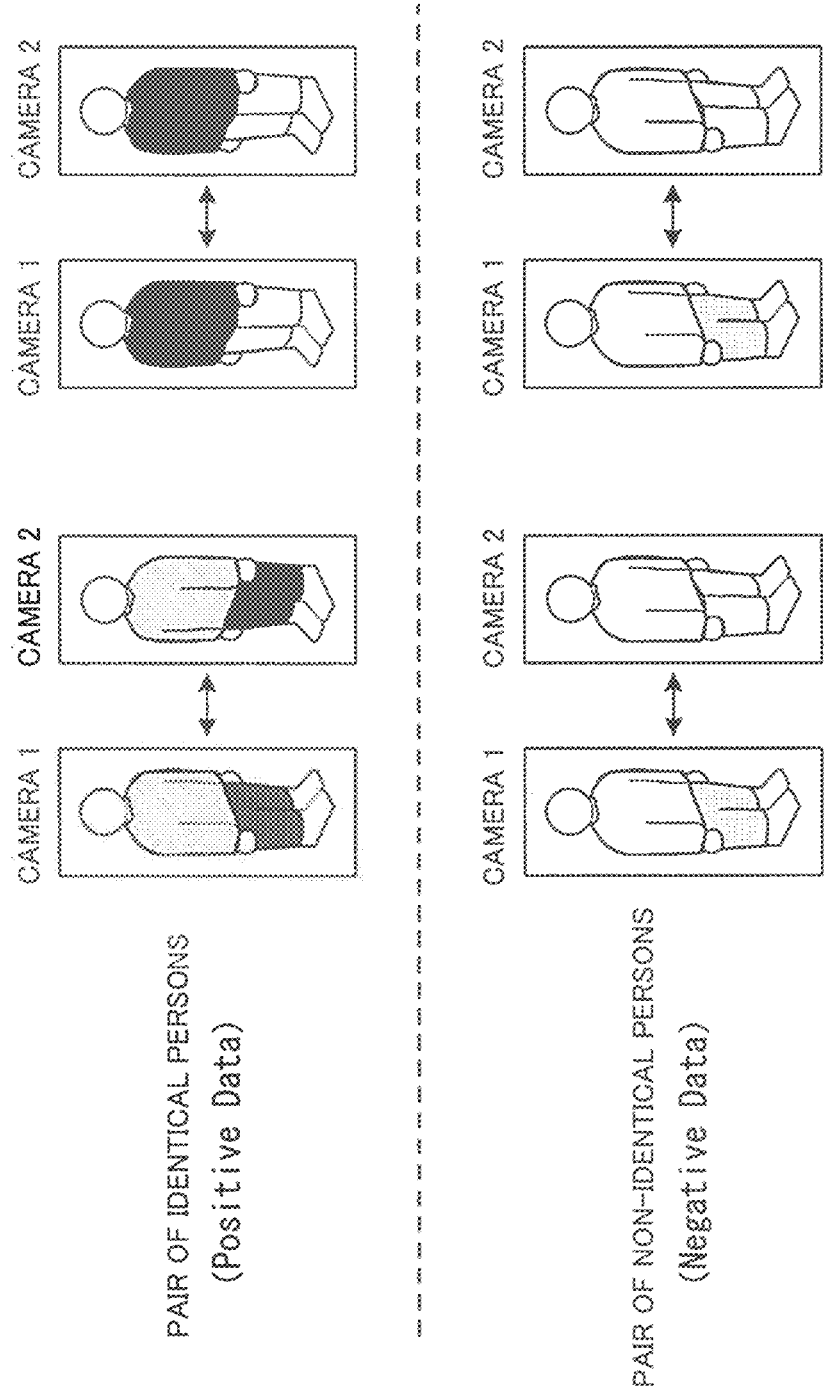
FIG. 8 is a diagram for describing images for learning.

The learning information input unit 513 receives an input of category likelihood information (category histogram), which is used in generating the category weight information 512 by the category weight information generation unit 515. As illustrated in FIG. 8, category likelihood information to be input is a category histogram (positive data) generated for object areas as identical objects within images captured in a pair of different capturing devices (camera pair) or in different capturing environments, and a category histogram (negative data) generated for object areas as non-identical objects. It is possible to use category likelihood information received by the learning information input unit 513, as an output for the category likelihood information generation unit 505.

The category weight information generation unit 515 generates the category weight information 512 to be used in calculating a degree of similarity for each category by using a pair of category histograms as positive data or a pair of category histograms as negative data, which is input from the learning information input unit 513. The category weight information generation unit 515 learns a weight for matching so that the matching ratio as to whether the persons are identical to each other is increased with use of these pieces of data. For instance, it is possible to use a linear SVM (Support Vector Machine) for learning. The category weight information generation unit 515 can generate the category weight information 512 for each camera pair i.e. for each pair of images captured in different environments.

Concerning a category in which the weight decreases (i.e. the degree of contribution in sameness determination is small), as a result of computation of a weight for each category by the category weight information generation unit 515, it is possible to eliminate the category in generating the likelihood distribution information 508 by the image processing system 100, or eliminate the category from the categories for sameness determination by the collation unit 509. This makes it possible to reduce the amount of data of the likelihood distribution information 508, and makes it possible to reduce the amount of processing in generating the likelihood distribution information 508, and the amount of processing by the collation unit 509. Consequently, it is possible to complete the processing within a short period of time.

(1.2.2 Flow of Processing)

Figure 9:
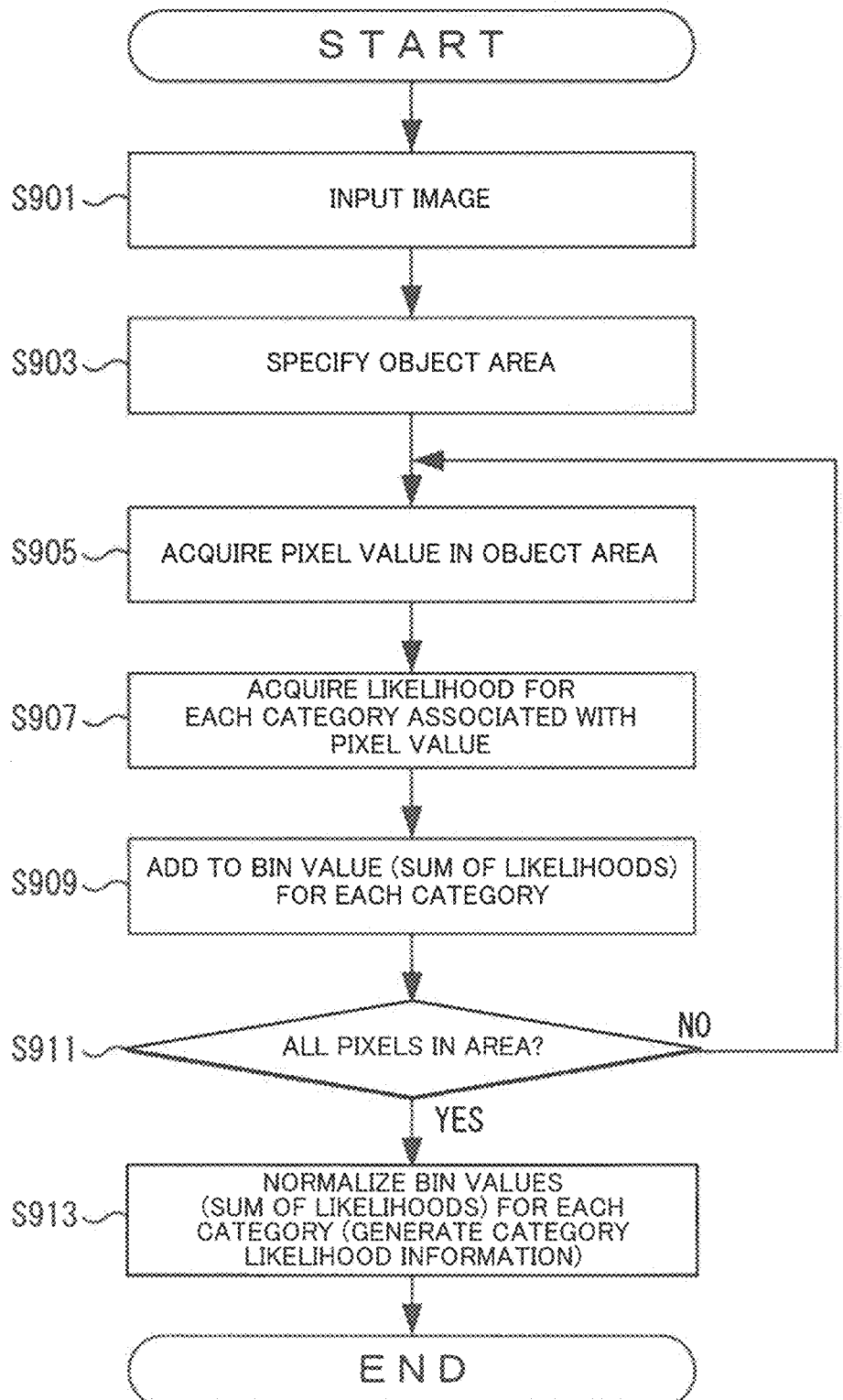
FIG. 9 is a flowchart illustrating a flow of processing by the image processing system illustrated in FIG. 1.
Figure 10:
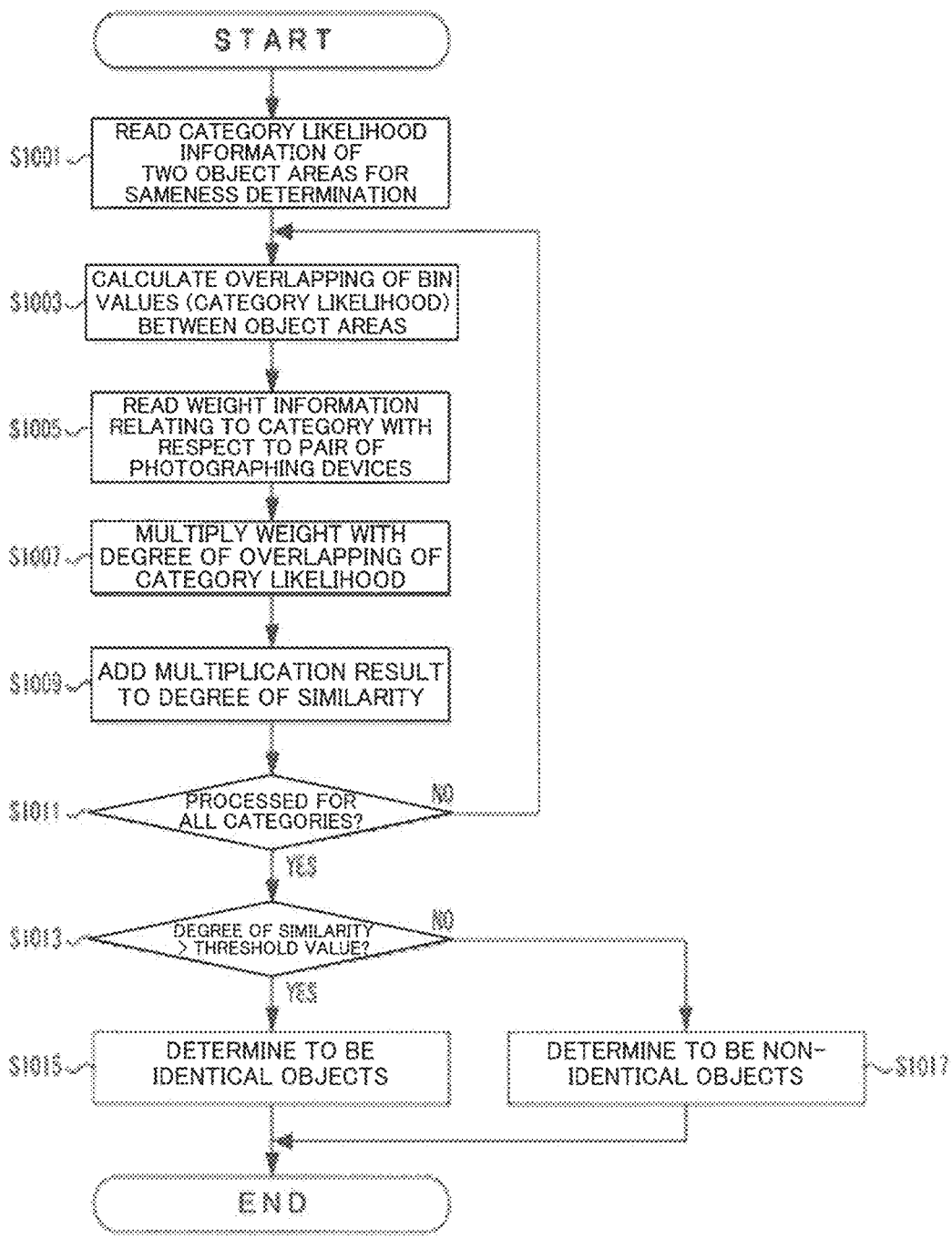
FIG. 10 is a flowchart illustrating a flow of processing by the image processing system illustrated in FIG. 1.

In the following, a flow of processing by the image processing system 500 is described referring to FIG. 9 and FIG. 10. FIG. 9 is a flowchart illustrating a flow of processing until category likelihood information (category histogram) is generated, and FIG. 10 is a flowchart illustrating a flow of processing in determining whether the objects are identical to each other.

(1.2.2.1 Flow of Processing in Generating Category Histogram)

As a first step, the image input unit 501 receives an input of an image to be processed (Step S901). The image is captured by one or more capturing devices. For instance, the image may be one or more image frames composing a video captured by one or more monitor cameras.

The pixel feature extraction unit 503 specifies from an input image an object area including an object for sameness determination (Step S903). Since an example of the method for specifying an object area is described above, description thereof is omitted herein.

Subsequently, the pixel feature extraction unit 503 selects one pixel from the object area, and acquires a pixel value of the pixel (Step S905). The pixel value may be expressed in various ways. For instance, the pixel value may include a color feature such as an RGB value and a feature to be obtained as a result of analyzing an image such as an edge.

The pixels to be extracted by the pixel feature extraction unit 503 and processed by the category likelihood information generation unit 505 to be described later may not be individual pixels, but may be a pixel block. In this case, it is possible to use an average value of pixel values within a pixel block, or a pixel value which appears most frequently within a pixel block, as a representative pixel value of the pixel block. According to this configuration, the number of pixels to be processed thereafter is reduced. This is advantageous in increasing the processing speed.

The category likelihood information generation unit 505 acquires a likelihood for each category by referring to the likelihood distribution information 508, while using a pixel value extracted by the pixel feature extraction unit 503 as a key (Step S907). The category likelihood information generation unit 505 adds the acquired value representing the likelihood to the bin value for each category (Step S909). The pixel feature extraction unit 503 and the category likelihood information generation unit 505 perform the aforementioned processing with respect to all the pixels within the object area (Step S911).

When the processing with respect to all the pixels within the object area is finished (Yes in Step S91), the category likelihood information generation unit 505 normalizes the bin values (i.e. a sum of the likelihoods) for each category, and generates category likelihood information (category histogram) (Step S913).

(1.2.2.2 Flow of Processing in Determining Sameness)

Next, the processing of determining sameness of objects included in images by the image processing system 500 is described referring to FIG. 10.

The collation unit 509 reads pieces of category likelihood information (category histograms) relating to two object areas for sameness determination, which are generated by the category likelihood information generation unit 505 (Step S1001). Then, the collation unit 509 calculates a degree of similarity between these two pieces of category likelihood information. In this example, the collation unit 509 calculates a degree of similarity by Eq. (4).

The collation unit 509 selects one category (in this example, $c_i$), and obtains the degree of overlapping between the two pieces of category likelihood information to be processed relating to the category (Step S1003). This processing corresponds to the processing of obtaining min (FetA$_i$, FetB$_i$) in Eq. (4). Subsequently, the collation unit 509 reads the category weight information 512 indicative of a weight for each category from the DB 511 (Step S1005). This processing corresponds to the term $\alpha_i$ in Eq. (4). Subsequently, the collation unit 509 multiplies the weight with the degree of overlapping between the likelihoods for each category, and adds the multiplication result to the value representing a degree of similarity s (Step S1009).

The collation unit 509 performs Step S1003 to Step S1009 with respect to all the categories (Step S1011). When the degree of similarity s obtained as a result of the processing exceeds a predetermined threshold value (Yes in Step S1013), the collation unit 509 determines that the objects included in the object areas to be processed are identical to each other (Step S1015). On the other hand, when the degree of similarity s is lower than the threshold value (No in Step S1013), the collation unit 509 determines that the objects included in the object areas to be processed are not identical to each other (Step S1017).

The flowchart of FIG. 10 is described regarding the processing of determining sameness. The exemplary embodiment, however, is not limited to the above. It is possible to use the flowchart for the purpose of searching in outputting objects which are highly likely to be identical to each other. In this case, Step S1013 to Step S1017 may not be performed, and the objects may be arranged in the descending order of the degree of similarity.

1.3 Example of Hardware Configuration

In the following, an example of a hardware configuration when the image processing system 100 or the image processing system 500 is implemented by a computer 1100 is described referring to FIG. 11. It is possible to implement the function of each of the image processing systems 100 and 500 by two or more computers or by one computer.

Figure 11:
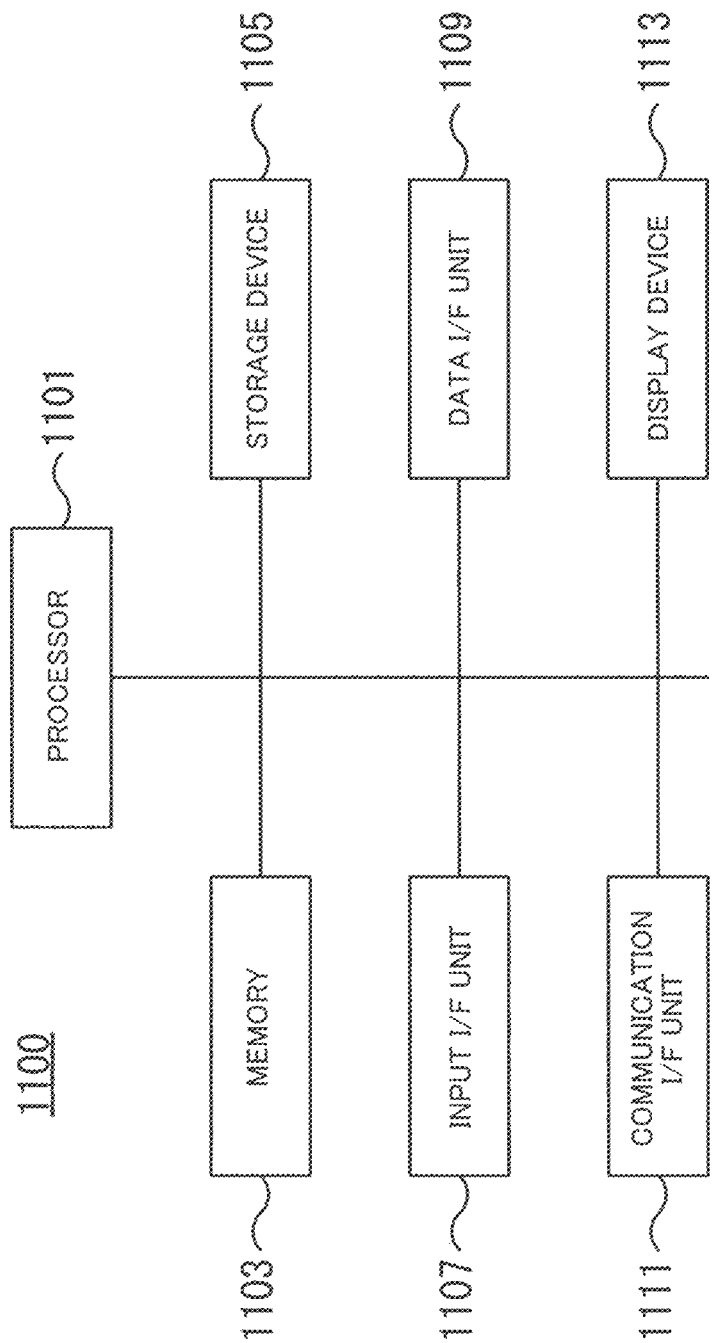
FIG. 11 is a block diagram illustrating a hardware configuration capable of implementing the image processing systems illustrated in FIG. 1 and FIG. 5.

As illustrated in FIG. 11, the computer 1100 includes a processor 1101, a memory 1103, a storage device 1105, an input interface (I/F) unit 1107, a data I/F unit 1109, a communication I/F unit 1111, and a display device 1113.

The processor 1101 controls various processings by the computer 1100 by executing a program stored in the memory 1103. For instance, the processing relating to the image input unit 101, the pixel feature extraction unit 103, and the likelihood distribution calculation unit 105 illustrated in FIG. 1, and the processing relating to the image input unit 501, the pixel feature extraction unit 503, the category likelihood information generation unit 505, the collation unit 509, the learning information input unit 513, and the category weight information generation unit 515 illustrated in FIG. 5 may be implemented as a program that is temporarily stored in the memory 1103, and is mainly operated on the processor 1101.

The memory 1103 is a storage medium such as an RAM (Random Access Memory). The memory 1103 temporarily stores program codes representing a program to be executed by the processor 1101, or data necessary for executing a program.

The storage device 1105 is a non-volatile storage medium such as a hard disk or a flash memory. The storage device 1105 is capable of storing various programs for implementing an operating system, or the image input unit 101, the pixel feature extraction unit 103, the likelihood distribution calculation unit 105, the image input unit 501, the pixel feature extraction unit 503, the category likelihood information generation unit 505, the collation unit 509, the learning information input unit 513, and the category weight information generation unit 515; and various data including the DB 107, the DB 507, and DB 511. The program or data stored in the storage device 1105 is referred to by the processor 1101 when loaded to the memory 1103 as necessary.

The input I/F unit 1107 is a device for receiving an input from the user. Examples of the input I/F unit 1107 are a keyboard, a mouse, and a touch panel. The input I/F unit 1107 may be connected to the computer 1100 via an interface such as a USB (Universal Serial Bus).

The data I/F unit 1109 is a device for inputting data from the outside of the computer 1100. An example of the data I/F unit 1109 is a drive device for use in reading data stored in various storage media. The data I/F unit 1109 may be provided on the outside of the computer 1100. In this case, the data I/F unit 1109 is connected to the computer 1100 via an interface such as a USB.

The communication I/F unit 1111 is a device for communicating data wiredly or wirelessly with a device on the outside of the computer 1100, for instance, a capturing device (e.g. a video camera, a monitor camera, or a digital camera). The communication I/F unit 1111 may be provided on the outside of the computer 1100. In this case, the communication I/F unit 1111 is connected to the computer 1100 via an interface such as a USB.

The display device 1113 is a device for displaying, for instance, a collation result by the collation unit 509. There are various methods for displaying a collation result on the display device 1113. For instance, it is possible to display images including objects which are determined to be identical in a certain order, or to display objects which are determined to be identical to an object to be tracked in a graphical manner. Examples of the display device 1113 are a liquid crystal display and an organic EL (Electro-Luminescence) display. The display device 1113 may be provided on the outside of the computer 1100. In this case, the display device 1113 is connected to the computer 1100 via a display cable, for instance.

1.4 Advantageous Effects of Exemplary Embodiment

As described above, the image processing system 100 in the exemplary embodiment is configured to express a visual feature of a target object in terms of frequency of appearance (likelihood) for each category, which is learned from sample images captured in various environments. This makes it possible to generate robust color distribution information with respect to a nonlinear capturing environment.

Further, the image processing system 500 in the exemplary embodiment generates a feature with use of the likelihood distribution information 508 generated by the image processing system 100, and determines whether the objects are identical to each other. In this configuration, a learning result taking into account a difference in capturing environment is reflected on a feature generated by using the likelihood distribution information 508. Therefore, it is possible to reduce the amount of computation, as compared with a configuration, in which a difference in capturing environment is taken into account in a method for determining a degree of similarity.

Further, the image processing system 500 calculates a degree of similarity, taking into account a linear weight for each category, which is learned in advance. Also in this aspect, it is possible to reduce the cost relating to computation processing.

In other words, each of the image processing systems 100 and 500 in the exemplary embodiment can appropriately process an image feature.

2 Second Exemplary Embodiment

Figure 12:
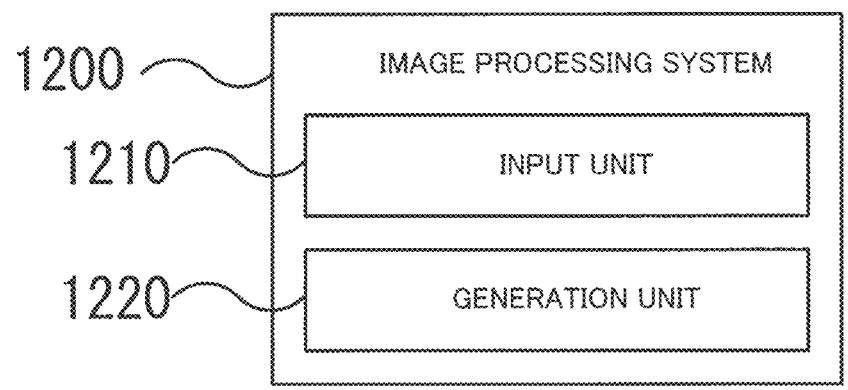
FIG. 12 is a functional block diagram illustrating a schematic configuration of an image processing system in a second exemplary embodiment.
Figure 13:
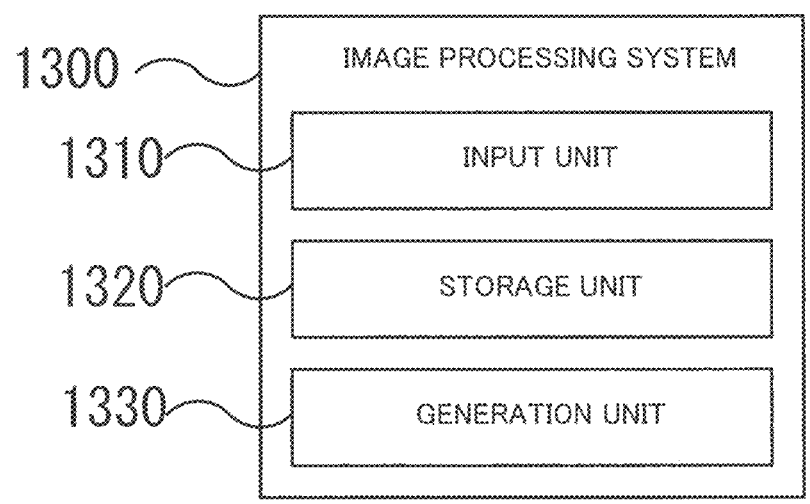
FIG. 13 is a functional block diagram illustrating a schematic configuration of an image processing system in the second exemplary embodiment.

In the following, the second exemplary embodiment is described referring to FIG. 12 and FIG. 13. FIG. 12 and FIG. 13 are block diagrams respectively illustrating functional configurations of image processing systems 1200 and 1300 which process an image feature. As illustrated in FIG. 12, the image processing system 1200 includes an input unit 1210 and a generation unit 1220.

The input unit 1210 receives an input of sample images obtained by capturing an object associated with a category in different conditions with respect to a plurality of the categories.

The generation unit 1220 generates likelihood distribution information in which each value representing a possible feature of each pixel, and each value representing a likelihood belonging to each of the categories are associated with each other, based on a feature of each pixel included in an area relating to each of the objects within the plurality of sample images associated with a category.

Further, as illustrated in FIG. 13, the image processing system 1300 includes an input unit 1310, a storage unit 1320, and a generation unit 1330.

The input unit 1310 receives an input of an image.

The storage unit 1320 stores likelihood distribution information, in which each value representing a possible feature of each pixel in the image, and each value representing a likelihood belonging to each of categories are associated with each other.

The generation unit 1330 generates category likelihood information indicative of a likelihood distribution relating to a plurality of categories of an object area by referring to the likelihood distribution information with respect to a value representing a feature of each pixel in the object area within the image.

The image processing systems 1200 and 1300 in the exemplary embodiment having the aforementioned configuration can appropriately process an image feature.

3 Supplementary Notes

The configurations of the exemplary embodiments may be combined, or a part of the configurations of the exemplary embodiments may be replaced. Further, the configuration of the invention is not limited to the exemplary embodiments. Various modifications may be applied as far as such modifications do not depart from the gist of the invention.

A part or all of each of the exemplary embodiments may be described as the following Supplementary Notes. The invention, however, is not limited to the following Supplementary Notes. Further, the program of the invention may be any program, as far as the program is a program that causes a computer to execute each of the operations described in each of the exemplary embodiments.

Supplementary Note 1

A processing system relating to an image feature, including an input means which receives an input of a plurality of sample images obtained by capturing an object associated with a category in different conditions with respect to a plurality of the categories; and a means which generates likelihood distribution information in which each value representing a possible feature of each pixel or each pixel block, and each value representing a likelihood belonging to each of the categories are associated with each other, based on a feature of each pixel or each pixel block included in an area relating to each of the objects within the plurality of sample images associated with a category.

Supplementary Note 2

The processing system according to Supplementary Note 1, wherein the feature includes a parameter for expressing a color, and the category is clothes of a certain color.

Supplementary Note 3

A processing system relating to an image feature, including an input means which receives an input of an image; a means which stores likelihood distribution information in which each value representing a possible feature of each pixel or each pixel block of the image, and each value representing a likelihood belonging to each of a plurality of categories are associated with each other; and a means which generates category likelihood information indicative of a likelihood distribution relating to the plurality of categories of one or more object areas by referring to the likelihood distribution information with respect to a value representing a feature of each pixel or each pixel block of the one or more object areas within the image.

Supplementary Note 4

The processing system according to Supplementary Note 3, further including a determination means which determines whether each of the one or more object areas relates to a same object, based on the category likelihood information to be generated for each of the one or more object areas within the image to be input by the input means.

Supplementary Note 5

The processing system according to Supplementary Note 4, wherein the determination means takes into account a weight for each value of the category likelihood information relating to each of the categories in determining whether each of the one or more object areas relates to the same object.

Supplementary Note 6

The processing system according to Supplementary Note 5, further including a means which calculates the weight for each of the categories with respect to a pair of capturing devices for capturing an image.

Supplementary Note 7

The processing system according to any one of Supplementary Notes 3 to 6, wherein the feature includes a parameter for expressing a color.

Supplementary Note 8

The processing system according to any one of Supplementary Notes 3 to 7, wherein the feature includes a parameter relating to a pattern.

Supplementary Note 9

A processing method relating to an image feature, the method causing a computer is caused to execute a step of receiving an input of a plurality of sample images obtained by capturing an object associated with a category in different conditions with respect to a plurality of the categories; and a step of generating likelihood distribution information in which each value representing a possible feature of each pixel or each pixel block, and each value representing a likelihood belonging to each of the categories are associated with each other, based on a feature of each pixel or each pixel block included in an area relating to each of the objects within the plurality of sample images associated with a category.

Supplementary Note 10

The processing method according to Supplementary Note 9, wherein the feature includes a parameter for expressing a color, and the category is clothes of a certain color.

Supplementary Note 11

A processing method relating to an image feature, the method causing a computer to execute a step of receiving an input of an image; a step of storing likelihood distribution information in which each value representing a possible feature of each pixel or each pixel block of the image, and each value representing a likelihood belonging to each of a plurality of categories are associated with each other; and a step of generating category likelihood information indicative of a likelihood distribution relating to the plurality of categories of one or more object areas by referring to the likelihood distribution information with respect to a value representing a feature of each pixel or each pixel block of the one or more object areas within the image.

Supplementary Note 12

The processing method according to Supplementary Note 11, in which the computer is caused to further execute a step of determining whether each of the one or more object areas relates to a same object, based on the category likelihood information to be generated for each of the one or more object areas within the image to be input.

Supplementary Note 13

The processing method according to Supplementary Note 12, wherein a weight for each value of the category likelihood information relating to each of the categories is taken into account in determining whether each of the object areas relates to the same object.

Supplementary Note 14

The processing method according to Supplementary Note 13, in which the computer is caused to further execute a step of calculating the weight for each of the categories with respect to a pair of capturing devices for capturing an image.

Supplementary Note 15

The processing method according to any one of Supplementary Notes 11 to 14, wherein the feature includes a parameter for expressing a color.

Supplementary Note 16

The processing method according to any one of Supplementary Notes 11 to 15, wherein the feature includes a parameter relating to a pattern.

Supplementary Note 17

A program relating to an image feature, which causes a computer to execute a process of receiving an input of a plurality of sample images obtained by capturing an object associated with a category in different conditions with respect to a plurality of the categories; and a process of generating likelihood distribution information in which each value representing a possible feature of each pixel or each pixel block, and each value representing a likelihood belonging to each of the categories are associated with each other, based on a feature of each pixel or each pixel block included in an area relating to each of the objects within the plurality of sample images associated with a category.

Supplementary Note 18

The program according to Supplementary Note 17, wherein the feature includes a parameter for expressing a color, and the category is clothes of a certain color.

Supplementary Note 19

A program relating to an image feature, which causes a computer to execute a process of receiving an input of an image; a process of storing likelihood distribution information in which each value representing a possible feature of each pixel or each pixel block of the image, and each value representing a likelihood belonging to each of a plurality of categories are associated with each other; and a process of generating category likelihood information indicative of a likelihood distribution relating to the plurality of categories of one or more object areas by referring to the likelihood distribution information with respect to a value representing a feature of each pixel or each pixel block of the one or more object areas within the image.

Supplementary Note 20

The program according to Supplementary Note 19, which causes the computer to further execute a process of determining whether each of the one or more object areas relates to a same object, based on the category likelihood information to be generated for each of the one or more object areas within the image to be input.

Supplementary Note 21

The program according to Supplementary Note 20, wherein a weight for each value of the category likelihood information relating to each of the categories is taken into account in determining whether each of the object areas relates to the same object.

Supplementary Note 22

The program according to Supplementary Note 21, which causes the computer to further execute a process of calculating the weight for each of the categories with respect to a pair of capturing devices for capturing an image.

Supplementary Note 23

The program according to any one of Supplementary Notes 19 to 22, wherein the feature includes a parameter for expressing a color.

Supplementary Note 24

The program according to any one of Supplementary Notes 19 to 23, wherein the feature includes a parameter relating to a pattern.

This application is based upon and claims the benefit of priority from Japanese patent application No. 2013-225917, filed on Oct. 30, 2013, the disclosure of which is incorporated herein in its entirety by reference.

REFERENCE SIGNS LIST

1: Category
2: Category
3: Category
5: Category
100: Image processing system
101: Image input unit
103: Pixel feature extraction unit
105: Likelihood distribution calculation unit
107: Database
108: Likelihood distribution information
500: Image processing system
501: Image input unit
503: Pixel feature extraction unit
505: Category likelihood information generation unit
507: Database
508: Likelihood distribution information
509: Collation unit
511: Database
512: Category weight information
513: Learning information input unit
515: Category weight information generation unit
1100: Computer
1101: Processor
1103: Memory
1105: Storage device
1107: Input interface unit
1109: Data interface unit
1111: Communication interface unit
1113: Display device
1200: Image processing system
1210: Input unit
1220: Generation unit
1300: Image processing system
1310: Input unit
1320: Storage unit
1330: Generation unit

The invention claimed is:

1. An image processing system, comprising:
a memory storing a set of instructions; and
a processor configured to execute the instructions to:
receive an input of a plurality of sample images obtained by capturing objects in different conditions;
generate likelihood distribution information of the plurality of sample images, in which values representing a pixel or a pixel block in an area of an object included in a sample image and values representing a plurality of likelihoods are associated with each other, each likelihood indicating a likelihood of belonging to one of a plurality of categories,
wherein the likelihood distribution information includes a first likelihood distribution information generated for a pair of sample images including a same object captured by different capturing devices or captured in different conditions, and a second likelihood distribution information generated for a pair of sample images including different objects;
calculate, using the first and second likelihood distribution information, a weight for each of the values representing the likelihood of belonging to each of the plurality of the categories; and
calculate a degree of similarity of areas of objects within different sample images based on the likelihood of belonging to each of the plurality of the categories and the calculated weight.

2. The processing system according to claim 1, wherein the plurality of categories relate to clothes of a certain color.

3. An image processing system, comprising:
a memory storing a set of instructions; and
a processor configured to execute the instructions to:
receive an input of an image;
store likelihood distribution information in which values representing a pixel or a pixel block and values representing a plurality of likelihoods are associated with each other, each likelihood indicating a likelihood of belonging to one of a plurality of categories, wherein the plurality of categories are defined according to an attribute of an object;
wherein the likelihood distribution information includes a first likelihood distribution information generated for a pair of sample images including a same object captured by different capturing devices or captured in different conditions, and a second likelihood distribution information generated for a pair of sample images including different objects;
generate first category likelihood information indicative of a likelihood distribution of a first object area in the image, by referring to the likelihood distribution information with respect to each pixel or each pixel block of the first object area;
generate second category likelihood information indicative of a likelihood distribution of a second object area in the image, by referring to the likelihood distribution information with respect to each pixel or each pixel block of the second object area;
calculate, using the first and second likelihood distribution information, a weight for each of the values representing the likelihood of belonging to each of the plurality of the categories; and
determine whether the first object area and the second object area relate to a same object, based on the first and the second category likelihood information and the calculated weight.

4. The image processing system according to claim 3, wherein the attribute relates to color.

5. The image processing system according to claim 3, wherein the attribute relates to pattern.

6. An image processing method, comprising:
receiving an input of a plurality of sample images obtained by capturing objects in different conditions;
generating likelihood distribution information of the plurality of sample images, in which values representing a pixel or a pixel block in an area of an object included in a sample image and values representing a plurality of likelihoods are associated with each other, each likelihood indicating a likelihood of belonging to one of a plurality of categories,
wherein the likelihood distribution information includes a first likelihood distribution information generated for a pair of sample images including a same object captured by different capturing devices or captured in different conditions, and a second likelihood distribution information generated for a pair of sample images including different objects;
calculating, using the first and second likelihood distribution information, a weight for each of the values representing the likelihood of belonging to each of the plurality of the categories; and
calculating a degree of similarity of areas of objects within different sample images based on the likelihood of belonging to each of the plurality of the categories and the calculated weight.

7. A processing method relating to an image feature, the processing method comprising:
receiving an input of an image;
storing likelihood distribution information in which values representing a pixel or a pixel block and values representing a plurality of likelihoods are associated with each other, each likelihood indicating a likelihood of belonging to one of a plurality of categories, wherein the plurality of categories are defined according to an attribute of an object;
wherein the likelihood distribution information includes a first likelihood distribution information generated for a pair of sample images including a same object captured by different capturing devices or captured in different conditions, and a second likelihood distribution information generated for a pair of sample images including different objects;
generating first category likelihood information indicative of a likelihood distribution of a first object area by referring to the likelihood distribution information with respect to each pixel or each pixel block of the first object area;
generating second category likelihood information indicative of a likelihood distribution of a second object area in the image, by referring to the likelihood distribution information with respect to each pixel or each pixel block of the second object area;
calculating, using the first and second likelihood distribution information, a weight for each of the values representing the likelihood of belonging to each of the plurality of the categories; and
determining whether the first object area and the second object area relate to a same object, based on the first and the second category likelihood information and the calculated weight.

8. A non-transitory computer readable storage medium recording thereon a program which when executed, causes, a computer to perform an image processing method, the method comprising:
receiving an input of a plurality of sample images obtained by capturing objects in different conditions;
generating likelihood distribution information of the plurality of sample images, in which values representing a pixel or a pixel block in an area of an object included in a sample image and values representing a plurality of likelihoods are associated with each other, each likelihood indicating a likelihood of belonging to one of a plurality of categories,
wherein the likelihood distribution information includes a first likelihood distribution information generated for a pair of sample images including a same object captured by different capturing devices or captured in different conditions, and a second likelihood distribution information generated for a pair of sample images including different objects;
calculating, using the first and second likelihood distribution information, a weight for each of the values representing the likelihood of belonging to each of the plurality of the categories; and
calculating a degree of similarity of areas of objects within different sample images based on the likelihood of belonging to each of the plurality of the categories and the calculated weight.

9. A non-transitory computer readable storage medium recording thereon a program which when executed, causes a computer to perform a method for image processing, the method comprising:
receiving an input of an image;
storing likelihood distribution information in which values representing a pixel or a pixel block and values representing a plurality of likelihoods are associated with each other, each likelihood indicating a likelihood of belonging to one of a plurality of categories, wherein the plurality of categories are defined according to an attribute of an object;
wherein the likelihood distribution information includes a first likelihood distribution information generated for a pair of sample images including a same object captured by different capturing devices or captured in different conditions, and a second likelihood distribution information generated for a pair of sample images including different objects;

generating first category likelihood information indicative of a likelihood distribution of a first object area by referring to the likelihood distribution information with respect to each pixel or each pixel block of the first object area;
generating second category likelihood information indicative of a likelihood distribution of a second object area in the image, by referring to the likelihood distribution information with respect to each pixel or each pixel block of the second object area;
calculating, using the first and second likelihood distribution information, a weight for each of the values representing the likelihood of belonging to each of the plurality of the categories; and
determining whether the first object area and the second object area relate to a same object, based on the first and the second category likelihood information and the calculated weight.

* * * * *